Oct. 2, 1956 A. G. THORP II 2,765,210

SHEET RECORD MACHINE

Filed Dec. 9, 1954

INVENTOR

Arthur G. Thorp II

BY George H. Fritzinger

Agt.

2,765,210

SHEET RECORD MACHINE

Arthur G. Thorp II, Whippany, N. J., assignor to Thomas A. Edison, Incorporated, West Orange, N. J., a corporation of New Jersey Application December 9, 1954, Serial No. 474,236

7 Claims. (Cl. 346—74)

This invention relates to recording and/or reproducing machines in which a flexible sheet record is carried in loop form on an endless peripheral surface of a revolvable record support and is scanned along a helical track by a translating head as the record support is revolved. More particularly, the invention relates to a novel guide structure for preventing the leading and/or trailing edges of the sheet record from fouling on the head during operation of the machine as well as during the loading and unloading of a sheet record onto and from the record support.

The typical sheet record for such machine is one having a substantially rectangular shape and comprising a non-magnetic base as of paper or plastic coated with finely divided magnetizable particles. The sheet record is attached to the record support at its leading edge and is carried in wrap-around relation thereto, with freedom for circumferential movement from its leading to its trailing edge, as the record support is revolved. The head is biased against the support and driven progressively as the record support is revolved so that it describes a helical track on the record loop with repeated crossing of the joint between the leading and trailing edges, this track appearing as a series of side-by-side parallel lines when the sheet record is removed and laid out flat. The sheet record is mounted by first attaching its leading edge to the record support in some suitable manner and then revolving the support to cause the sheet record to be wrapped therearound. Reversely, a mounted sheet record is removed by reversely turning the support while stripping the sheet record therefrom by a stripper plate engageable with the under side of the trailing edge of the sheet record.

In such machines there are encountered problems of avoiding fouling of the leading or trailing edge of the sheet record on the translating head. Fouling of the leading edge during operation of the machine may be avoided by causing the leading edge to be overlapped by the trailing edge; however, it is not always desirable to overlap the edges instead of having them merely in a butt joint relationship. Even when the edges are overlapped there is a fouling problem during the loading of a sheet record, as while the support is turned through the first revolution following attachment of the leading edge of the sheet record thereto, and there is always a fouling problem as with respect to the trailing edge while the support is reversely rotated to strip the sheet record therefrom.

An object of my invention is to provide a guide structure effective in all positions of the translating head in its path of travel for guiding an exposed leading and/or trailing edge of a mounted sheet record past the head.

Another object is to provide an improved guide structure in the path of the translating head for maintaining a mounted sheet record at such path in close proximity with the peripheral surface of the record support.

Another object is to provide a guide structure encircling the record support and adapted to maintain the sheet record in close proximity thereto at all points therearound while still providing facility for engagement of the translating head with the sheet record in a path transverse to the direction of revolvement of the record support.

A feature of the invention resides in providing a stationary guide structure encircling the record support but provided with an opening to permit engagement of the translating head with the sheet record along a path transverse thereto, and of providing in this opening at each side of the head an extensible guide the inner edges of which are adapted to provide at all times an even and continuous extension of the inner surface of the stationary guide structure around the support.

These and other objects and features of my invention will be apparent from the following description and the appended claims.

In the description of my invention reference is had to the accompanying drawings, of which:

Figure 1:
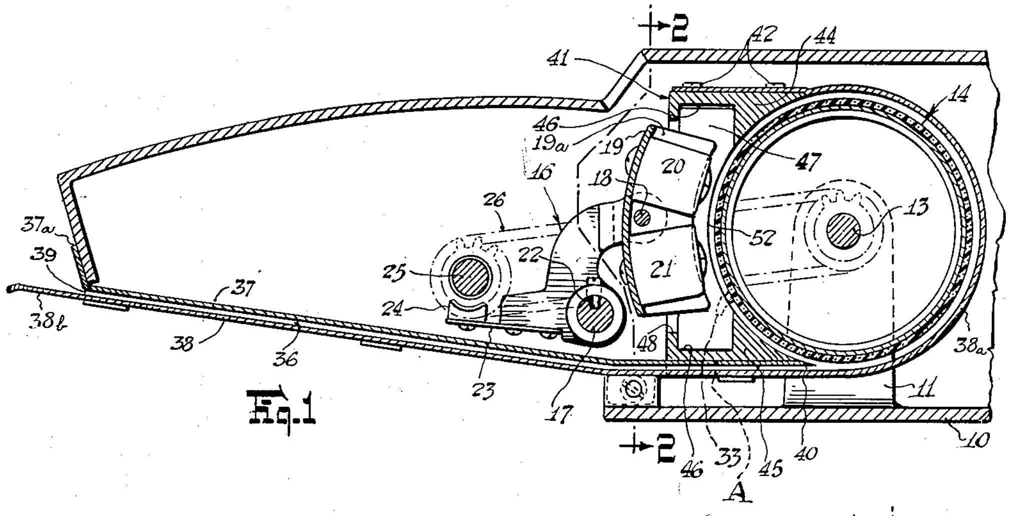
Figure 1 is a vertical section of a sheet record machine embodying my invention, taken substantially on the line 1—1 of Figure 2.
Figure 2:
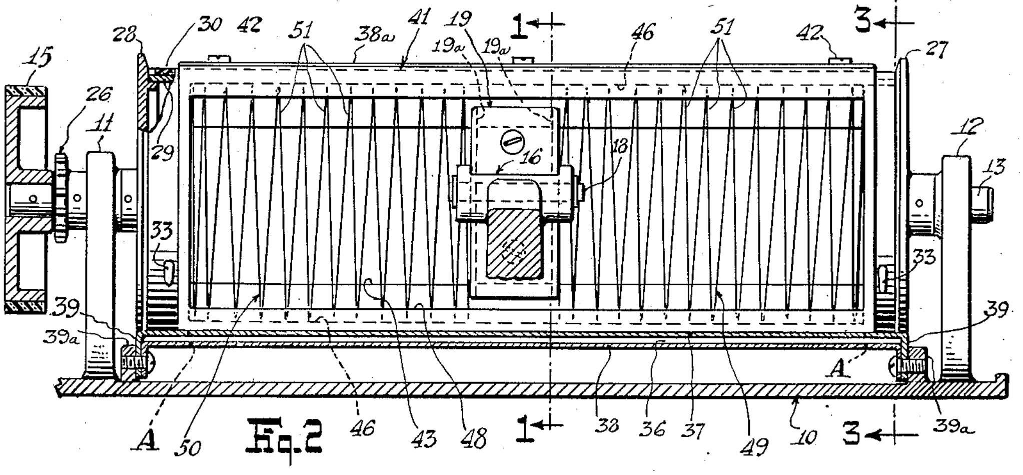
Figure 2 is a front vertical section taken substantially on the line 2—2 of Figure 1.

The sheet record magnetic recording and reproducing machine shown in the accompanying drawings may have a base plate 10 provided with laterally-spaced upright standards 11 and 12. These standards have bearings for a shaft 13 carrying a rotatable record support in the form, for example, of a drum 14. The drum is rotated by suitable drive mechanism only fractionally shown as comprising a drive wheel 15 mounted on one end of the shaft 13. At the front of the drum 14 there is a carriage 16 mounted slidably on a cross rod 17 for lateral movement along the drum. Pivoted at 18 to this carriage is a rocker beam 19 onto one end of which is mounted an erasing head 20 and onto the other end of which is mounted a record-reproduce head 21. The carriage 16 can be rocked rearwardly and forwardly to place the heads into and out of engagement with the record support. For this purpose the carriage is splined at 22 to the support rod 17 so that the shifting of the carriage is accomplished by turning the rod itself. Mounted on the carriage is a cantilever spring 23 carrying a feed nut 24 which is moved into and out of engagement with a feed screw 25 concurrently as the carriage is rocked back and forth to place the heads into and out of engagement with the record support. This 25 feed screw has a constant drive coupling with the shaft 13 as by means of a chain drive fractionally indicated at 26. The feed screw and support rod 17 are mounted in suitable bearings at their ends which need not however be herein shown.

Figure 3:
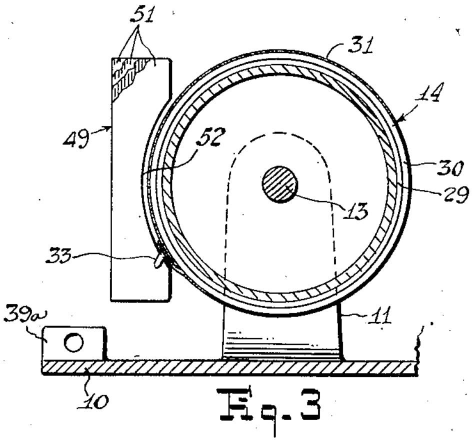
Figure 3 is a fractional view with parts removed, as seen from the line 3—3 of Figure 2.

The drum 14 has flanges 27 and 28 at its ends which are bridged by a tubular member 29 covered by a resilient material 30 such as rubber to provide a yieldable backing for a sheet record 31 mounted thereon (Figure 3). The sheet record has drive holes or eyelets in its leading corner portions which are engaged by respective hooks or drive pins 33 at opposite ends of the drum to provide for drive of the sheet record with the record support as the record support is advanced.

The two heads 20 and 21 are preferably positioned to contact the sheet record in a plane at right angles to the shaft 13 so that they ride in the same track on the record. In response to suitable biasing of the carriage they engage the sheet record with necessary pressure to have firm contact with the record. When the drum is driven in an advancing direction, the heads are moved progressively along the drum to describe the helical track aforementioned, with the erase head being in advance of the record head to erase any prior recording on the track. Of course, during reproducing, the erase head is disabled.

The audio circuits of the machine for feeding energy to and from the heads need not be herein described for the purposes of the present invention.

The loading apparatus may be of the form disclosed in the co-pending application Serial No. 468,442, filed November 12, 1954, and having common ownership with the present application. Such loading apparatus is provided with a loading slot 36 at least approximately as long as the sheet record 31 to be mounted on the drum. This loading slot is formed throughout its major length by a pair of spaced plates 37 and 38 having turned-over edges 39 closing the slot at the sides. These turned-over edges are bolted together and connected to supporting lugs 39*a* standing up from the base 10. The plate 37—which is the one nearer the drum—terminates just short of the drum on a line tangential thereto, but the other plate 38 has an extension 38*a* which encircles the back side of the drum in spaced relation thereto to form a continuation of the slot 36. The extension 38*a* as well as a terminal portion of the plate 37 are reduced in width starting from about the line A shown in Figure 1 so that these plates will clear the drive pins 33. As described in the application just mentioned, the forward end of the loading slot 36 may have an outwardly-flared opening to facilitate the inserting of a sheet record thereinto, which may be formed by an extension 38*b* of the plate 38 and an upper inclined extension 37*a* of the top plate 37.

Upon inserting a sheet record through its full length into the loading slot and then advancing the drum 14, either manually or by the drive mechanism, the drive pins 33 will move through the space at the sides of the terminal portion of the upper plate 37 and the extension 38*a* of the lower plate, and will deflect the side portions of the sheet record downwardly beyond the lower plate 38*a*. When the drive pins come into registration with the drive holes of the sheet record, the side portions move upwardly in response to the natural resilience of the sheet record material causing the sheet record to be engaged by the drive pins and to be drawn from the loading slot into wrap-around relation with the drum.

The plate 37 is terminated in an edge 40 adjacent to the drum so that it will serve as a stripping member to engage the under side of the trailing edge of the sheet record and strip the record from the drum as the drum is reversely rotated. Also, this plate serves to direct the sheet record into the loading slot 36 as it is stripped from the drum, causing the trailing edge of the sheet record to make its appearance at the flared opening where it may be picked up to withdraw the sheet record from the machine.

At the front of the drum there is provided, in accordance with my invention, a hollow rectangular frame 41 which bridges the space from the terminal end of the extension 38*a* to the terminal end of the stripper plate 37 and which extends horizontally along the drum from one drive pin to the other. This frame is secured at the top by screws 42 to the extension 38*a* and is suitably secured at its bottom face to the stripper plate 37 so that there is formed a rigid structure completely encircling the drum except for the opening into the loading slot 36. The frame has a long rectangular window 43 to permit access of the heads 20 and 21 to the sheet record throughout the length of the path of travel of the heads. The frame has heavy wall portions 44 and 45 at the top and bottom which are provided with arcuate inner surfaces which conform to the periphery of the drum and continue the guide surface of the extension plate 38*a* around the drum except for the window 43.

The frame 41 is in the nature of a casement having interior grooves 46 in the top and bottom walls thereof to form a rectangular space 47 within the frame which is open at the back only by way of the window 43 and which is open at the front only by way of a window 48. The heads 20 and 21 project through the forward window 48 into this rectangular space as shown in Figure 1. Mounted in this rectangular space at opposite sides of the heads 20 and 21 are accordion springs 49 and 50 respectively. Each of these accordion springs comprises a series of plate-like leaves 51 interconnected at their ends in a pleated formation. Each accordion spring is confined within the frame without any substantial play by a close sliding fit of the top and bottom ends of the plate-like leaves with the grooves 46. The ends of each accordion spring engage the respective end of the frame 41 and a respective side flange 19*a* on the rocker beam 19, and may be mechanically connected thereto. Preferably, however, each accordion spring comprises a great many leaves of spring-like material to give it sufficient resilience to span the distance of travel of the heads so that it will press constantly against the frame and rocker beam at its ends without need for any mechanical connection thereto. Thus, at all times, the accordion springs extend from the heads to the ends of their path of travel across the sheet record.

As shown clearly in Figure 1, the heavy top and bottom wall portions 44 and 45 of the frame 41 end in knife-like edges at the window 43, with the result that a front portion of the drum extends into the rectangular space 47. However, the leaves of the accordion springs are cut away to have arcuate edges 52 that extend from one knife edge to the other in conformity with the drum whereby to provide a guide structure completely encircling the drum from one side of the loading slot 36 to the other without presenting any discontinuities or abrupt edges onto which the trailing and leading edges of a sheet record might catch. The advantages of this complete encirclement of the drum by such guide structure is that whether or not the heads are raised from the drum during sheet loading and unloading the leading and trailing edges are guided past the heads, without buckling, by the smooth and continuous guide surfaces of the guide structure surrounding the drum. With this guide structure it is even feasible upon using a sheet record of suitable srtength and stiffness, to mount the sheet record on the drum in the usual way but with exposed leading and trailing edges in butt joint relationship without encountering buckling as the edges pass the heads in the operation of the machine.

The particular embodiment of my invention herein particularly shown and described is intended to be illustrative and not limitative of my invention since the same is subject to changes and modifications without departure from the scope of my invention, which I endeavor to express according to the following claims.

I claim:

1. In a machine having a revolvable record support with an endless peripheral surface for carrying a flexible sheet record in wrap-around relation thereto, and having means for attaching the leading edge of the sheet record to the support to provide for drive of the sheet record with the support as the support is revolved: the combination of a translating head; means for progressively driving said head in a path crosswise to the direction of revolvement of said support as the support is revolved; and extensible means extending from opposite sides of said head to the ends of said path and moved at its ends with said head to cause contraction of one of said means and concurrent expansion of the other, the inner edges of said extensible means being in close proximity with the peripheral surface of said support and in conformity therewith to maintain said sheet record adjacent to said support throughout said path in all positions of said head in said path.

2. In a sheet record machine: the combination of a revolvable record support having an endless peripheral surface for supporting a sheet record in the form of an at least substantially closed loop; means on said support for attaching the leading edge of the sheet record to the support to provide for revolvement of the sheet record loop therewith, said loop having freedom for circumferential movement from its leading to its trailing edge; a translating head engageable with the sheet record and mounted for traveling movement in a path crosswise to the direction of revolvement of the record support; means for gradually moving said head concurrently as said support is revolved; and extensible guide means in said path at opposite sides of said head, said extensible means having the ends adjacent said head in driven engagement therewith and the inner edges of said extensible means being in conforming relation with said record support to confine said sheet record at said path in close juxtaposition to said support in all positions of said head in its path.

3. In a sheet record machine: the combination of a removable record support having an endless peripheral surface for supporting a sheet record in the form of an at least substantially closed loop; means on said support for attaching the leading edge of the sheet record to the suport to provide for revolvement of the sheet record loop therewith, said loop having freedom for circumferential movement from its leading to its trailing edge; a translating head engageable with the sheet record and mounted for traveling movement in a path crosswise to the direction of revolvement of the record support; means for gradually moving said head concurrently as said support is revolved; an arcuate stationary guide substantially encircling said record support from one side of said path to the other; and extensible means at opposite sides of said head in said path cooperating with said stationary guide to complete the encirclement of said support and provide a continuation of the guide surface across said path in all positions of said head.

4. In a sheet record machine: the combination of a revolvable record support having an endless peripheral surface for supporting a sheet record in the form of an at least substantially closed loop; means on said support for attaching the leading edge of the sheet record to the support to provide for revolvement of the sheet record loop therewith, said loop having freedom for circumferential movement from its leading to its trailing edge; a rectangular frame at one side of said support extending crosswise thereto; a translating head for scanning the sheet record; means mounting said head for movement within said frame in a path transverse to said support; and accordion-type extensible means in said frame between the sides of said head and the ends of said frame for confining the sheet record in close juxtaposition to said support at the path of said head.

5. The combination set forth in claim 4 including guide means cooperating with said extensible means and frame and encircling said support to provide a substantially continuous and even guide surface across said path and around said support.

6. The combination set forth in claim 4 including a guide means substantially encircling said support from one edge of said frame to the opposite edge thereof, said guide means, frame and extensible means being uniformly spaced from the periphery of said support and in cooperative relationship to provide a substantially continuous and even guide surface encircling said support.

7. In a machine having a movable record support with an endless record-supporting surface about which a flexible sheet record is wrapped, and having means for attaching the leading edge of the sheet record to the support to provide for drive of the sheet record with the support in wrap-around relation thereto as the support is advanced: the combination of a loading and stripping means for directing a sheet record in position for attachment to said support and for engaging the under side of the trailing edge of the sheet record to strip it from the support as the support is reversely revolved; a translating head mounted for transverse movement across the sheet record; guide means encircling said support from one side of said loading and stripping means to the other for confining all portions of the mounted sheet record in close proximity with said support and preventing buckling of the sheet record as the support is reversely revolved, said guide means comprising stationary means and cooperating extensible means, said extensible means being disposed in the path of said head at each side thereof; and means to cause adjacent ends of said extensible means to be moved with said head, with contraction of one and concurrent expansion of the other, said extensible means and stationary means having inner surfaces continuous around said support and uniformly spaced therefrom.

References Cited in the file of this patent

UNITED STATES PATENTS

| | | |
|---|---|---|
| 2,469,423 | Wise et al. | May 10, 1949 |
| 2,672,346 | Roberts | Mar. 16, 1954 |
| 2,710,191 | Williams | June 7, 1955 |